No. 663,123. Patented Dec. 4, 1900.
R. C. HILL.
APPARATUS FOR MAKING PAILS OR THE LIKE.
(Application filed May 31, 1900.)
(No Model.)
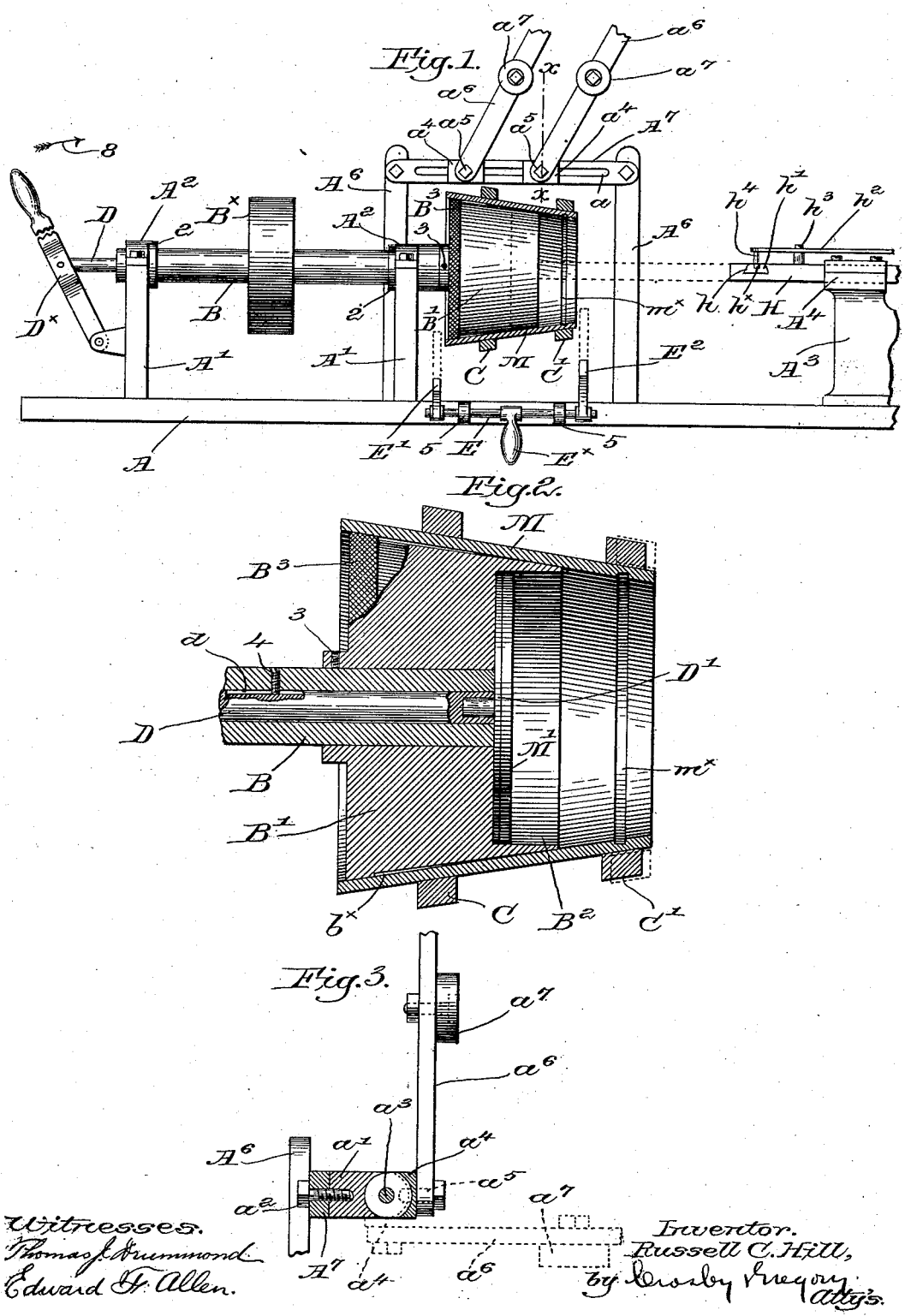

UNITED STATES PATENT OFFICE.

RUSSELL C. HILL, OF KEENE, NEW HAMPSHIRE.

APPARATUS FOR MAKING PAILS OR THE LIKE.

SPECIFICATION forming part of Letters Patent No. 663,123, dated December 4, 1900.

Application filed May 31, 1900. Serial No. 18,577. (No model.)

*To all whom it may concern:*

Be it known that I, RUSSELL C. HILL, a citizen of the United States, residing at Keene, county of Cheshire, State of New Hampshire, have invented an Improvement in Apparatus for Making Pails or the Like, of which the following description, in connection with the accompanying drawings, is a specification, like characters on the drawings representing like parts.

This invention has for its object the production of a simple and effective device for making pails and the like, whereby the handling of the pail-body is greatly decreased and the rapidity and ease of manipulation expedited.

In the manufacture of pails a number of different machines have heretofore been employed to perform the operations of scouring the ends, cutting the bottom-croze, setting the bottom in the pail-body, and setting the hoops, the pail-body set up in suitable clamps being moved from one piece of apparatus to another. In my present invention I have provided an organized apparatus for performing these various operations without changing the pail-body from a common supporting device, the different mechanisms being so arranged as to be movable into position relatively to the support to effect the desired operations upon the pail-body.

Figure 1 is a side elevation, partly in section, of an apparatus embodying my invention, a pail-body being shown in position on the support ready for the bottom to be set. Fig. 2 is an enlarged longitudinal sectional view of the support, showing the follower and a bottom ready to be set in the pail-body on the support; and Fig. 3 is an enlarged sectional detail on the line $x\,x$, Fig. 1, of the hoop-setting means.

The organized apparatus is shown in Fig. 1, the various parts of the same being mounted on a suitable base A, which is provided with standards A', having bearings $A^2$ for a hollow shaft B, provided with a pulley $B^\times$ to receive a belt by which rotation may be imparted to the shaft from any suitable source of power, (not shown,) the shaft having suitable collars 2 thereon to prevent longitudinal movement. Referring now to Figs. 1 and 2, said shaft has secured upon it, as by a set-screw 3 or in any other suitable manner, a support B' for the body of the pail or bucket which is to be acted upon by the various mechanisms, said support being shown as frustoconical in shape and recessed at its outer end, as at $B^2$. An annular rib $B^3$ is formed on the exterior of the support at or near its larger end, the surface of the said rib being roughened or corrugated in any suitable manner in order to engage the interior of the pail-body to retain the same in place and to rotate with the support B', as will be described.

The pail or bucket body M is made of usual staves set up and held in position by annular clamps C C' of usual construction in pail-making, said clamps, it being understood, being used temporarily to hold the staves of the body together until the hoops are set.

The support B' tapers outwardly from the end of the shaft B, as herein shown, and the pail-body is placed upon the support, as shown in Figs. 1 and 2, the taper of the support conforming substantially to the taper of the pail. It will be noted, however, that the annular rib $B^3$ by its engagement with the inner surface of the pail-body leaves a clearance $b^\times$, Fig. 2, between the greater portion of the surface of the support and the pail-body in order to permit spring or give of the latter when the upper hoop is being set.

A rod D is extended longitudinally through the hollow shaft and at its forward end is provided with a circular follower D', which is movable into and out of the recess $B^2$ of the support, said rod having a longitudinal groove $d$ therein to be entered by a screw-stud or other projection 4, extended through the shaft B, in order to permit longitudinal movement of the rod while effecting its rotation in unison with the shaft.

Longitudinal movement of the rod, and consequently the follower D, is effected in any suitable manner, as by a handle $D^\times$, fulcrumed on one of the standards A' and connected with the end of the rod projecting from the rear end of the shaft, as shown in Fig. 1, by any usual form of coupling which will permit rotation of the rod with the shaft. It is necessary to scour the ends of the pail-body, and for this purpose I have mounted in bearings 5 on the base A a rock-shaft E, provided with a suitable handle $E^\times$ and having fast upon it suitable scouring devices E' E², of any well-known or suitable construction, adapted to be moved into position (see dotted lines, Fig. 1) to scour the upper and lower ends of the pail-body, respectively.

The scouring devices E' E² may have sandpaper or other abrading material applied to their inner faces to smooth off the ends of the staves, as is common, and the particular construction of the scouring devices is immaterial so far as my invention is concerned.

Normally the scouring devices occupy the full-line position shown in Fig. 1; but it will be noted that they are so located that they can be moved into operative position while the pail-body is on the support B'.

The pail-body is provided with a croze or internal annular groove to receive the bottom M' (shown in Fig. 2 as within the recess B²) in position ready to be moved by the outward travel of the follower to be set in the croze, as will be hereinafter described.

In order to cut the croze $m^\times$, I have shown a suitable crozing device mounted on a standard A³, erected on the base A in front of and beyond the smaller end of the work-support B', said standard having a guideway A⁴ for a longitudinal slide-bar H, which is movable into dotted-line position, Fig. 1, within the projecting smaller end of the pail-body as the latter is held on the support, said slide having a transverse guideway $h$ for a cutter-block $h'$, provided with a croze-cutter $h^\times$, of usual construction. A lever $h^2$, fulcrumed on the slide-bar H at $h^3$, is connected at $h^4$ with the cutter-slide block $h'$ to move the latter transversely into or out of operative position.

When it is desired to cut the croze, the operator moves the slide-bar H into position within the open smaller end of the pail-body, and then by means of the lever $h^2$ moves the cutter-slide $h'$ laterally to bring the cutter $h^\times$ into engagement with the inner surface of the pail-body to cut the croze $m^\times$ as the body is rotated with the support B'. After the croze has been cut the croze-cutting means is withdrawn into normal position, as shown in Fig. 1, and the setting of the bottom is then effected. Prior to such setting, however, the lower clamp C' is loosened in order to permit the spread of the staves as the bottom is set.

Referring now to Fig. 2 and supposing that the clamp C' has been loosened—as, for instance, into dotted-line position—and that the bottom M' is within the recess B² of the support, resting against the follower D', the operative moves the handle D$^\times$ in the direction of the arrow 8, Fig. 1, and the rod D is moved longitudinally within the hollow shaft B, carrying the follower D' and the pail-bottom out of the recess in the smaller end of the work-support into the smaller end of the pail-body, such movement of the follower being continued until the pail-bottom snaps or is forced into the croze $m^\times$. The follower is then drawn and the bottom hoop is set after the clamp C' has been removed. After the setting of the bottom hoop the upper hoop is set and the pail is then ready to be removed from the support and the inside scoured in usual manner.

I have provided herein means for conveniently setting the hoops while the pail-body is still on the support B'.

Standards A⁶, erected on the base A at one side of and opposite the work-support B', are connected by a cross-bar A⁷, longitudinally slotted at $a$.

Adjustable blocks $a'$ (see Fig. 3) are held in adjusted position on the cross-bar A⁷ by means of clamp-screws $a^2$, two of such blocks being shown in Fig. 1, each block having pivotally connected therewith, as by a pin $a^3$, a hinge member $a^4$, which latter can be swung about the pivot $a^3$ into dotted-line position, Fig. 3, the said pivots $a^3$ being parallel to the axis of rotation of the support B'.

Upon each hinge member $a^4$ is pivoted at $a^5$ an arm $a^6$, provided with a roll $a^7$, which is adapted to be brought into engagement with the lower side of the hoop when the latter is to be set.

In Fig. 1 the hoop-setting means is shown in inoperative position; but supposing that the pail is ready to be hooped one of the arms $a^6$—as, for instance, the one to set the bottom hoop—will be moved into dotted-line position, Fig. 3—that is, substantially into dotted-line, Fig. 3—to bring its roll $a^7$ into position to engage the lower edge of the bottom hoop. (Not shown.) The clamp C' having been removed and the hoop placed upon the pail-body the operator swings the arm $a^6$ about its pivot $a^5$ toward the upper end of the pail-body, the roll $a^7$ traveling against the lower edge of the hoop, and the latter is forced tightly into place as the pail-body is rotated on the support B'. After the lower hoop is set the upper clamp C is loosened or removed and the upper hoop slipped onto the pail-body, and the said hoop is set with the left-hand setting device, (shown in Fig. 1,) as has been described for the lower hoop, after which the arms $a^6$ are thrown back into normal inoperative position and the hooped and bottomed pail can be removed from the support B'. In setting the upper hoop it is desirable to compress the staves of the pail-body in order to tightly clamp or set the hoop in place, and the necessary yield or spring of the staves is permitted by the clearance $b^\times$ hereinbefore referred to.

Inasmuch as the lower end of the pail-body projects a considerable distance beyond the support, it will be obvious that no further provision is necessary for the springing or yielding of the staves when setting the lower hoop.

From the foregoing description it will be manifest that after the pail-body has been set up in the temporary clamps and applied to the support it is not removed therefrom until the various operations of scouring, crozing, bottoming, and hooping have been effected, thereby reducing the handling of the pail-body to a minimum and increasing the rapidity and ease with which such various operations can be effected.

So far as I am aware it is broadly new to provide a common support for a pail-body while the various operations of scouring, crozing, bottoming, and hooping are carried out, the pail-body remaining upon one and the same support throughout such various operations, and it is broadly new, so far as I am aware, to provide a support for the pail-body adapted to enter the same and hold it in position while operated upon. My invention accordingly is not restricted to the precise construction and arrangement of parts herein shown, as the same may be modified or rearranged in various particulars without departing from the spirit and scope of my invention. Neither do I limit my invention to the particular forms of mechanisms which are arranged to act upon the pail-body in performing the operations of end-scouring, crozing, and hoop-setting, as other forms of such mechanisms may be employed instead of those herein shown and described.

Having fully described my invention, what I claim as new, and desire to secure by Letters Patent, is—

1. In an apparatus of the class described, a frusto-conical support to receive thereupon and sustain a pail-body, said support having a recess in its outer end, the smaller end of the pail-body projecting beyond the recessed end of the support, a follower movable into said recess, to receive the pail-bottom, and means to actuate the follower and move the bottom out of the recess and set it in position in the projecting end of the pail-body, while the latter is in position on the support.

2. In an apparatus of the class described, a rotatable frusto-conical support adapted to be inserted in the pail-body, an annular roughened holding-rib on said support near its larger end, to engage and hold the body in position thereon, leaving a clearance between the support and body intermediate the rib and the smaller end of the support, and means to scour the ends of the pail-body while on the support.

3. In an apparatus of the class described, a rotatable frusto-conical support shorter than the depth of the pail-body and adapted to be inserted therein, said support having a recessed smaller end, a follower movable into said recess, means to move the follower longitudinally to set the bottom in place in the pail-body, and a croze-cutter mounted beyond the recessed end of the support and movable into position within the projecting end of the pail, to cut the bottom-croze therein before the bottom is set by the follower.

4. In an apparatus of the class described, a rotatable frusto-conical support for the pail-body, means carried thereby to set the bottom in the pail-body, hoop-setting means mounted adjacent the support, and movable into position to set the hoops on the pail, and croze-cutter means movable into the smaller end of the pail-body while on the support, to cut the bottom-croze therein.

5. In an apparatus of the class described, a rotatable frusto-conical support for the pail-body, means carried thereby to set the bottom in the pail-body, and hoop-setting means mounted adjacent the support and movable longitudinally thereof and also capable of movement into position to engage and set the hoops.

6. In an apparatus of the class described, a base, a rotatable frusto-conical support for the pail-body, mounted thereon, means carried by said support to set the bottom while the pail-body is held thereon, hoop-setting means carried by the base adjacent the support and movable into position relatively thereto to set the hoops, and a croze-cutting device also mounted on the base, and movable independently into position to act upon the pail-body while held on the support.

7. In an apparatus of the class described, a rotatable frusto-conical support to receive the pail-body thereupon, an annular, external rib on the larger end of the support, to provide a clearance between the support and the inner surface of the pail-body, and hoop-setting means to set the hoops while the body is held on the support, the clearance permitting the larger end of the body to give when the upper hoop is set.

8. In an apparatus of the class described, a rotatable, frusto-conical support to receive the pail-body thereupon, a hollow shaft to which the support is secured, the smaller end of the latter being recessed, a follower movable into and out of said recess, an actuating-rod secured to the follower and extended through the shaft, and means to permit longitudinal movement of said rod while rotatable with the shaft.

9. In an apparatus of the class described, a support adapted to be inserted within the pail-body and shorter than the latter, means to cut the bottom-croze while the body is on the support, and means carried by the support to set the pail-bottom after the bottom-croze has been cut.

In testimony whereof I have signed my name to this specification in the presence of two subscribing witnesses.

RUSSELL C. HILL.

Witnesses:
HIRAM BLAKE,
ERNEST L. STANFORD.